United States Patent
Noguchi et al.

(10) Patent No.: US 11,480,970 B2
(45) Date of Patent: Oct. 25, 2022

(54) VEHICLE CONTROL SYSTEM

(71) Applicant: HONDA MOTOR CO., LTD., Tokyo (JP)

(72) Inventors: Junpei Noguchi, Wako (JP); Masahiro Kowada, Wako (JP); Miki Tsujino, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 61 days.

(21) Appl. No.: 16/831,102

(22) Filed: Mar. 26, 2020

(65) Prior Publication Data

US 2020/0310445 A1 Oct. 1, 2020

(30) Foreign Application Priority Data

Mar. 29, 2019 (JP) .............................. JP2019-068096

(51) Int. Cl.
*G05D 1/02* (2020.01)
*G05D 1/00* (2006.01)
(Continued)

(52) U.S. Cl.
CPC ............ *G05D 1/0214* (2013.01); *B60R 11/04* (2013.01); *G05D 1/0033* (2013.01);
(Continued)

(58) Field of Classification Search
CPC .. G05D 1/0214; G05D 1/0033; G05D 1/0246; G05D 2201/0213; B60R 11/04;
(Continued)

(56) References Cited

U.S. PATENT DOCUMENTS

| 2012/0217764 A1* | 8/2012 | Ishiguro | E05B 81/78 |
| | | | 296/1.07 |
| 2014/0236412 A1* | 8/2014 | Sung | B62D 15/0285 |
| | | | 701/23 |

(Continued)

FOREIGN PATENT DOCUMENTS

| JP | 2017007399 A | * | 1/2017 |
| JP | 2017007399 A | | 1/2017 |

OTHER PUBLICATIONS

Translation of JP-2017007399-A (Year: 2017).*

*Primary Examiner* — Rachid Bendidi
*Assistant Examiner* — Selena M Jin
(74) *Attorney, Agent, or Firm* — Armstrong Teasdale LLP (57) ABSTRACT

A vehicle control system includes a terminal, a control device, and an external environment sensor. The control device includes an action plan unit, an external environment recognizing unit, and a traveling control unit. The terminal includes a position detection unit and an input unit. In a case where a prescribed condition is satisfied, the action plan unit computes or maintains a traveling route that is not restricted by a person to be present in a moving side area located on one lateral side for which a vehicle should be headed. In a case where the prescribed condition is not satisfied, the action plan unit computes the traveling route such that the vehicle reaches a parking position after moving straight for a prescribed distance or more. The prescribed condition is satisfied in a case where a position of the terminal is present in the moving side area.

8 Claims, 5 Drawing Sheets

(51) Int. Cl.
*B60R 11/04* (2006.01)
*B60R 1/12* (2006.01)
(52) U.S. Cl.
CPC .... *G05D 1/0246* (2013.01); *B60R 2001/1253* (2013.01); *G05D 2201/0213* (2013.01)
(58) Field of Classification Search
CPC ........... B60R 2001/1253; B60W 30/06; B62D 15/0285
See application file for complete search history.

(56) References Cited

U.S. PATENT DOCUMENTS

| | | | | |
|---|---|---|---|---|
| 2014/0333769 | A1* | 11/2014 | Shibuya | G07C 9/00 348/148 |
| 2015/0375742 | A1* | 12/2015 | Gebert | G08G 1/168 701/23 |
| 2016/0272244 | A1* | 9/2016 | Imai | G08G 1/166 |
| 2018/0065665 | A1* | 3/2018 | Urhahne | G06K 9/00798 |
| 2019/0016332 | A1* | 1/2019 | Shin | G01S 15/931 |
| 2019/0092317 | A1* | 3/2019 | Bonander | B60W 30/06 |
| 2019/0171218 | A1* | 6/2019 | Hammond | G05D 1/024 |
| 2019/0197322 | A1* | 6/2019 | Suzuki | G06V 20/58 |
| 2020/0079361 | A1* | 3/2020 | Suzuki | B62D 15/0285 |
| 2020/0111369 | A1* | 4/2020 | Cho | G01S 15/66 |
| 2020/0142400 | A1* | 5/2020 | Kuwabara | B62D 15/027 |
| 2021/0197896 | A1* | 7/2021 | Bogner | B62D 6/00 |
| 2022/0017093 | A1* | 1/2022 | Tamori | B60W 60/0011 |

* cited by examiner

*Fig.2A* rear ← → front

*Fig.2B* rear ← → front

VEHICLE CONTROL SYSTEM

TECHNICAL FIELD

The present invention relates to a vehicle control system that can execute remote autonomous parking processing of a vehicle by using a terminal carried by a user.

BACKGROUND ART

In conventional remote autonomous parking processing of a vehicle, a traveling route from an initial position to a parking position is computed so as to avoid an obstacle. For example, JP2017-7399A discloses a parking assist device that computes a traveling route so as to avoid an obstacle. This parking assist device determines whether the obstacle is the user who is performing a remote operation and computes the traveling route without regarding the user as the obstacle. In this parking assist device, an efficient traveling route may be computed by not regarding the user in the traveling route as the obstacle on the assumption that the user can escape from the traveling route.

In remote autonomous parking processing, the vehicle needs to be moved to a parking position as soon as possible. However, the above parking assist device computes the traveling route so as to avoid any obstacles other than the user. That is, the above parking assist device computes the traveling route so as to avoid the obstacle even when an object regarded as the obstacle is expected to escape from the traveling route. Therefore, the traveling route becomes unnecessarily long.

SUMMARY OF THE INVENTION

In view of such a problem of the prior art, a primary object of the present invention is to provide a vehicle control system that can execute remote autonomous parking processing such that a vehicle can be safely moved to a parking position along a relatively short traveling route.

To achieve such an object, one embodiment of the present invention provides a vehicle control system (1) that includes a terminal (3) configured to be carried by a user; a control device (15) configured to execute remote autonomous parking processing to move a vehicle (V) from an initial position to a parking position and to stop the vehicle at the parking position in response to an instruction from the terminal; and an external environment sensor (7) configured to detect an obstacle around the vehicle and to send a detection result to the control device, wherein the control device includes an action plan unit (43) configured to compute a traveling route of the vehicle from the initial position to the parking position, an external environment recognizing unit (41) configured to recognize presence/absence of the obstacle around the vehicle based on the detection result sent from the external environment sensor, and a traveling control unit (44) configured to make the vehicle travel along the traveling route, the terminal includes a position detection unit (32) configured to obtain a terminal position that indicates a position of the terminal and an input unit (30) configured to accept an instruction to move the vehicle and an instruction to stop the vehicle, in a case where a prescribed condition is satisfied, the action plan unit computes or maintains the traveling route that is not restricted by a person to be present in a moving side area located on one lateral side for which the vehicle should be headed when the vehicle travels from the initial position, in a case where the prescribed condition is not satisfied, the action plan unit computes the traveling route such that the vehicle reaches the parking position after moving straight for a prescribed distance or more, and the prescribed condition is satisfied in a case where the terminal position is present in the moving side area.

According to this arrangement, if the user and the person are present in the moving side area, the user is expected to move the person by some means (for example, by speaking to the person). Therefore, while ensuring safety, it is possible to select a relatively short traveling route that is not restricted by the person to be present in the moving side area. On the other hand, if the user is not present in the moving side area and the person is present in the moving side area, it is possible to ensure safety by moving the vehicle straight and detecting the person by the external environment sensor.

Preferably, the external environment sensor includes a pair of front sensors (17) provided at front ends of lateral faces of the vehicle to detect the obstacle on either lateral side of the vehicle and a pair of rear sensors (17) provided at rear ends of the lateral faces of the vehicle to detect the obstacle on either lateral side of the vehicle, and the prescribed distance is a distance in a fore-and-aft direction between the pair of front sensors and the pair of rear sensors.

According to this arrangement, by moving the vehicle straight for the prescribed distance, the person that was present in any area of the blind spot of the sensors at the initial position can be detected.

Preferably, in a case where the external environment recognizing unit recognizes the person present in the moving side area based on the detection result sent from the external environment sensor while the vehicle is moving straight along the traveling route computed such that the vehicle reaches the parking position after moving straight for the prescribed distance or more, the action plan unit computes the traveling route again such that the vehicle avoids the person or makes the traveling control unit stop or decelerate the vehicle.

According to this arrangement, even if the person is present in the blind spot of the user and the external environment sensor in the initial position, safety of the person can be ensured.

Preferably, the prescribed condition is satisfied in a case where the terminal position is present in a front or rear of the vehicle.

According to this arrangement, the user present in a front or rear of the vehicle is expected to monitor the moving side area, so that a relatively short traveling route can be selected.

Another embodiment of the present invention provides a vehicle control system (1) that includes a terminal (3) configured to be carried by a user; a control device (15) configured to execute remote autonomous parking processing to move a vehicle (V) from an initial position to a parking position and to stop the vehicle at the parking position in response to an instruction from the terminal; and an external environment sensor (7) configured to detect an obstacle around the vehicle and to send a detection result to the control device, wherein the control device includes an action plan unit (43) configured to compute a traveling route of the vehicle from the initial position to the parking position, an external environment recognizing unit (41) configured to recognize presence/absence of the obstacle around the vehicle based on the detection result sent from the external environment sensor, and a traveling control unit (44) configured to make the vehicle travel along the traveling route, the terminal includes a position detection unit (32) configured to obtain a terminal position that indicates a position of the terminal and an input unit (30) configured to accept an instruction to move the vehicle and an instruction to stop the vehicle, in a case where a prescribed condition is satisfied, the traveling control unit makes the vehicle travel at a first speed along the traveling route computed such that the traveling route is not restricted by a person to be present in a moving side area located on one lateral side for which the vehicle should be headed when the vehicle travels from the initial position, in a case where the prescribed condition is not satisfied, the traveling control unit makes the vehicle travel at a second speed lower than the first speed along the traveling route at least in a prescribed section from the initial position, and the prescribed condition is satisfied in a case where the terminal position is present in the moving side area.

According to this arrangement, if the user and the person are present in the moving side area, the user is expected to move the person by some means (for example, by speaking to the person). Therefore, while ensuring safety, it is possible to select a relatively short traveling route that is not restricted by the person to be present in the moving side area. On the other hand, if the user is not present in the moving side area and the person is present in the moving side area, it is possible to ensure safety by making the vehicle travel at a low speed so that sufficient time is provided for the person to escape from a certain area where the person can be caught by the vehicle.

Preferably, the external environment sensor includes at least one external camera (18) provided in a door mirror and/or a center pillar of the vehicle and configured to capture an image of a rear of either lateral part of the vehicle and/or an image of either lateral side of the vehicle, the external environment recognizing unit is configured to determine whether an alighting person who alighted from the vehicle was present by comparing images captured by the at least one external camera immediately before and immediately after a door of the vehicle is opened and closed, and the prescribed condition is satisfied in a case where the external environment recognizing unit determines that the alighting person was not present in the moving side area.

According to this arrangement, it is possible to determine whether the alighting person was present by comparing images captured with a short time difference while the vehicle is stopped. Therefore, it is possible to determine whether the alighting person was present by using relatively simple logic.

Preferably, the prescribed condition is satisfied in a case where the external environment recognizing unit determines that the alighting person was present in the moving side area and determines, based on the image captured by the at least one external camera after the door is opened and closed and before the vehicle starts to travel, that the alighting person has left a certain area where the alighting person can be caught by the vehicle before entering a blind spot of the at least one external camera, and the prescribed condition is not satisfied in a case where the terminal position is present in an opposite side area located on another lateral side and the external environment recognizing unit determines that the alighting person was present in the moving side area and determines, based on the image captured by the at least one external camera, that the alighting person stays within the certain area at a timing when a remote operation of the vehicle is started or that the alighting person enters the blind spot of the at least one external camera before leaving the certain area.

According to this arrangement, the person is limited to the alighting person, and the external camera recognizes the position of the alighting person or recognizes that the position of the alighting person is unknown. Therefore, the monitoring target can be simplified, and the logic for recognizing the monitoring target can be simplified. Also, the person other than the alighting person can be detected by the external environment sensor before the vehicle is stopped at the initial position, so that safety of the person other than the alighting person can be ensured.

Preferably, the initial position is located at a front of the parking position, and a fore-and-aft direction of the vehicle in the initial position is approximately orthogonal to the fore-and-aft direction of the vehicle in the parking position or an angle between the fore-and-aft direction of the vehicle in the initial position and the fore-and-aft direction of the vehicle in the parking position is acute.

According to this arrangement, by locating the initial position and the parking position as described above, the traveling route for moving the vehicle backward to the parking position can be shortened. Therefore, the user can alight from the vehicle near the position where the user can easily monitor the vehicle during a remote operation thereof.

Thus, according to one embodiment of the present invention, it is possible to provide a vehicle control system that can execute remote autonomous parking processing such that a vehicle can be safely moved to a parking position along a relatively short traveling route.

DESCRIPTION OF THE PREFERRED EMBODIMENT(S)

Figure 1:
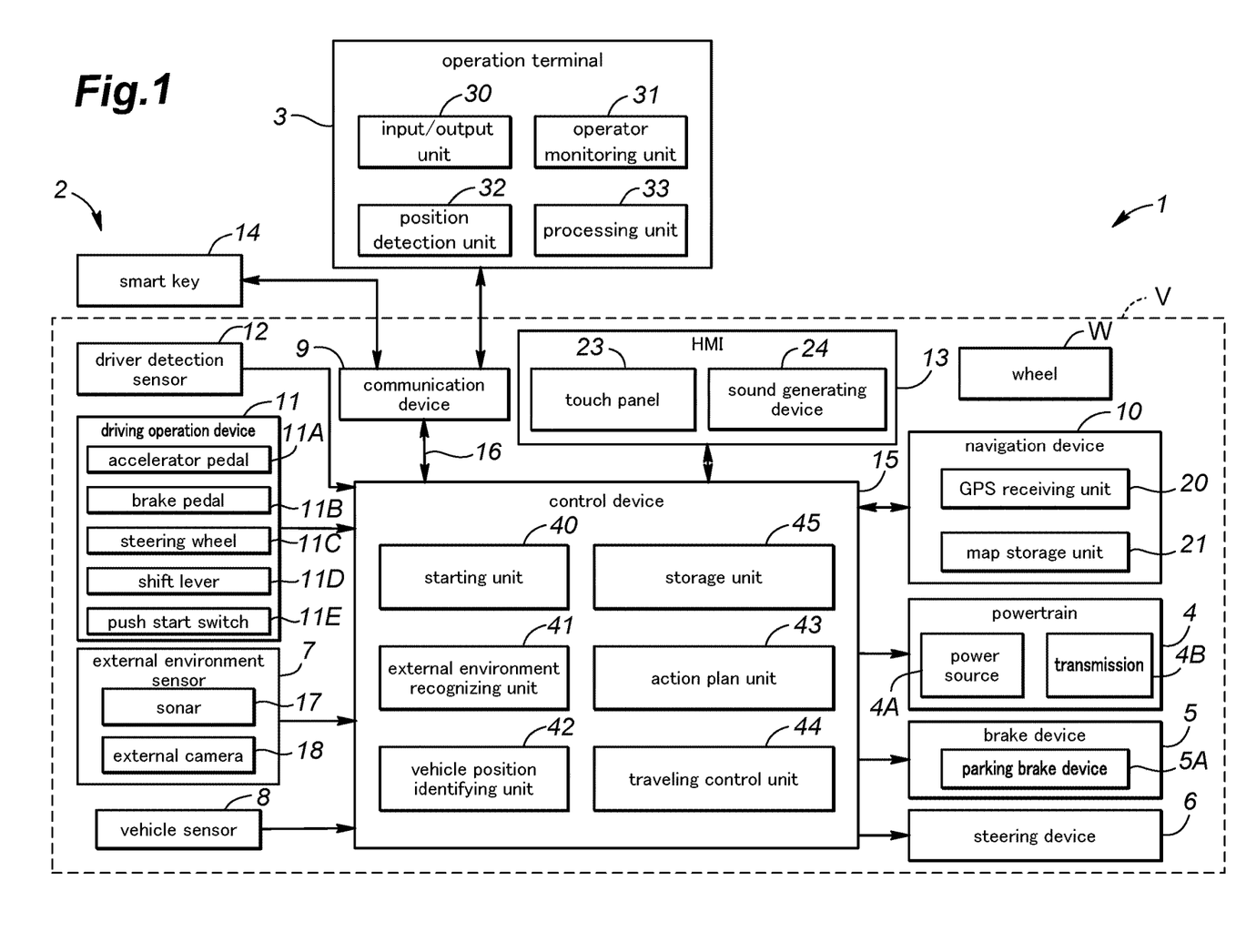
FIG. 1 is a functional block diagram of a vehicle control system according to an embodiment of the present invention.

As shown in FIG. 1, the vehicle control system 1 includes a vehicle system 2 and at least one operation terminal 3. The vehicle system 2 includes a powertrain 4, a brake device 5, a steering device 6, an external environment sensor 7, a vehicle sensor 8, a communication device 9, a navigation device 10, a driving operation device 11, a driver detection sensor 12, an HMI 13, a smart key 14, and a control device 15. The above components of the vehicle system 2 are connected to each other by communication means such as a controller area network 16 (CAN) so that a signal can be transmitted between the above components. The above components of the vehicle system 2 except the smart key 14 are mounted to the vehicle V.

The powertrain 4 is a device that applies a driving force to the vehicle V. The powertrain 4 includes a power source 4A and a transmission 4B, for example. The power source 4A includes at least one of an internal combustion engine such as a gasoline engine and a diesel engine and an electric motor. The brake device 5 is a device that applies a brake force to the vehicle V. For example, the brake device 5 includes a brake caliper that presses a brake pad against a brake rotor and an electric cylinder that supplies an oil pressure to the brake caliper. The brake device 5 includes a parking brake device 5A that restricts rotations of wheels W via wire cables. The steering device 6 is a device for changing a steering angle of the wheels W. For example, the steering device 6 includes a rack-and-pinion mechanism that steers (turns) the wheels W and an electric motor that drives the rack-and-pinion mechanism. The powertrain 4, the brake device 5, and the steering device 6 are controlled by the control device 15.

The external environment sensor 7 is a sensor that detects electromagnetic waves, sound waves, and the like from the periphery of the vehicle V to detect an object outside the vehicle V. The external environment sensor 7 includes sonars 17 and external cameras 18. The external environment sensor 7 may further include a millimeter wave radar or a laser lidar. The external environment sensor 7 outputs a detection result to the control device 15.

Figure 2A:
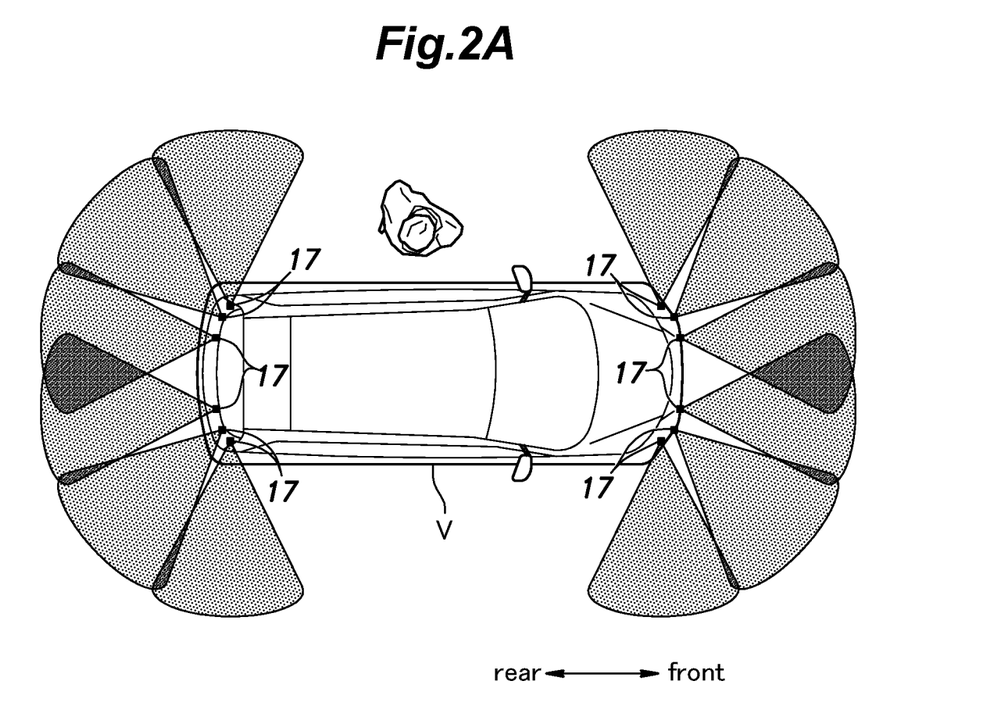
FIG. 2A is a schematic plan view showing sonars provided in a vehicle and detection areas of the sonars in the vehicle control system according to the embodiment of the present invention.

Each sonar 17 consists of a so-called ultrasonic sensor. Each sonar 17 emits ultrasonic waves around the vehicle V and captures the ultrasonic waves reflected by the object to detect a position (distance and direction) of the object. As shown in FIG. 2A, a plurality of sonars 17 are provided at a rear part and a front part of the vehicle V, respectively. In the present embodiment, two pairs of sonars 17 are provided on left and right sides of a rear bumper, two pairs of sonars 17 are provided on left and right sides of a front bumper, and one pair of sonars 17 are provided at front and rear ends of each of left and right faces of the vehicle V. That is, the vehicle V is provided with six pairs of sonars in total. In FIG. 2A, detection areas of the sonars 17 are colored. The sonars 17 provided on the rear bumper mainly detect a position of an object behind the vehicle V. The sonars 17 provided on the front bumper mainly detect a position of an object in front of the vehicle V. The sonars 17 provided at the front ends of the left and right faces of the vehicle V detect a position of an object on left and right outsides of the front end of the vehicle V, respectively. The sonars 17 provided at the rear ends of the left and right faces of the vehicle V detect a position of an object on left and right outsides of the rear end of the vehicle V, respectively.

Figure 2B:
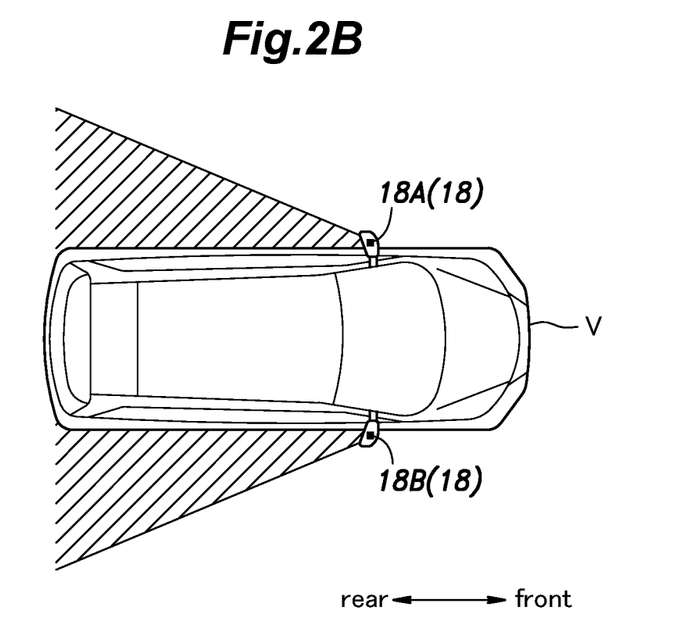
FIG. 2B is a schematic plan view showing door mirror cameras provided in the vehicle and image capturing areas of the door mirror cameras in the vehicle control system according to the embodiment of the present invention.

The external cameras 18 are devices that capture images around the vehicle V. Each external camera 18 consists of a digital camera using a solid imaging element such as a CCD or a CMOS, for example. The external cameras 18 include a front camera that captures an image of the front of the vehicle V and a rear camera that captures an image of the rear of the vehicle V. As shown in FIG. 2B, the external cameras 18 include a pair of left and right door mirror cameras 18A, 18B that are provided in the vicinity of the door mirrors of the vehicle V to capture images behind left and right sides of the vehicle V. In FIG. 2B, image capturing areas (detection areas) of the door mirror cameras 18A, 18B are hatched. The external cameras 18 may include a pair of left and right pillar cameras provided on center pillars (B pillars) of the vehicle V to capture images of left and right outsides of the vehicle V.

The vehicle sensor 8 includes a vehicle speed sensor that detects the speed of the vehicle V, an acceleration sensor that detects the acceleration of the vehicle V, a yaw rate sensor that detects the angular velocity around a vertical axis of the vehicle V, and a direction sensor that detects the direction of the vehicle V. For example, the yaw rate sensor consists of a gyro sensor.

The communication device 9 mediates (relays) wireless communication between the control device 15 and the operation terminal 3. Thereby, the control device 15 can communicate with the operation terminal 3 carried by the user via the communication device 9. The communication device 9 may utilize a known communication method such as infrared communication or Bluetooth (registered trademark), for example.

The navigation device 10 is a device that obtains a current position of the vehicle V and provides route guidance to a destination and the like. The navigation device 10 includes a GPS receiving unit 20 and a map storage unit 21. The GPS receiving unit 20 identifies a position (latitude and longitude) of the vehicle V based on a signal received from an artificial satellite (positioning satellite). The map storage unit 21 consists of a known storage device such as a flash memory or a hard disk, and stores map information.

The driving operation device 11 is provided in a vehicle cabin of the vehicle V and accepts an input operation (driving operation) by the driver (user) to control the vehicle V. The driving operation device 11 includes an accelerator pedal 11A, a brake pedal 11B, a steering wheel 11C, a shift lever 11D, and a push start switch 11E (engine start button). The push start switch 11E accepts a starting operation of the vehicle V (input operation to start operation of the vehicle V) by the driver. The driving operation device 11 may further include an element to activate the parking brake device 5A. The driving operation device 11 includes a sensor that detects an operation amount of the input operation, and outputs a signal indicating the operation amount of the input operation to the control device 15.

The driver detection sensor 12 is a sensor to detect that the driver (user) is sitting on a driver's seat. For example, the driver detection sensor 12 consists of a seat sensor provided on a seat surface of the driver's seat. The seat sensor may consist of a capacitance-type sensor to detect a change in capacitance, or may consist of a membrane-type switch that is turned on when the driver sits on the driver's seat. Alternatively, the driver detection sensor 12 may consist of an indoor camera that captures an image of the driver sitting on the driver's seat. Alternatively, the driver detection sensor 12 may consist of a seat belt sensor to detect that the driver fastens a seat belt of the driver's seat based on information as to whether a tongue of the seat belt is inserted into a buckle thereof. The driver detection sensor 12 outputs a detection result to the control device 15.

The HMI 13 notifies the user of various kinds of information by a display or a voice, and accepts an input operation by the user. For example, the HMI 13 includes a touch panel 23 that accepts the input operation by the user and a sound generating device 24 such as a buzzer and a speaker. The touch panel 23 includes a liquid crystal display, an organic EL display, and the like.

The control device 15 consists of an electronic control device (ECU) that includes a CPU, a nonvolatile memory such as a ROM, a volatile memory such as a RAM, and the like. The CPU executes operation processing according to a program so that the control device 15 executes various types of vehicle control. The control device 15 may be composed of one piece of hardware, or may be composed of a unit including plural pieces of hardware. Further, the functions of the control device 15 may be at least partially executed by hardware such as an LSI, an ASIC, and an FPGA, or may be executed by a combination of software and hardware.

The smart key 14 (FOB key) is a known wireless terminal that can be carried by the user. The smart key 14 can communicate with the control device 15 from outside the vehicle V via the communication device 9. The smart key 14 includes a button to accept input by the user. The user can release a door lock and start the operation of the vehicle V by operating the button of the smart key 14.

The operation terminal 3 consists of a wireless terminal that can be carried by the user, and can communicate with the control device 15 from outside the vehicle V via the communication device 9. In the present embodiment, the operation terminal 3 consists of a smartphone. A prescribed application is installed on the operation terminal 3 in advance so that the operation terminal 3 can communicate with the control device 15. The operation terminal 3 is provided with a terminal ID, which is a prescribed numerical value to identify the operation terminal 3.

As shown in FIG. 1, the operation terminal 3 includes an input/output unit 30, an operator monitoring unit 31, a position detection unit 32, and a processing unit 33.

The input/output unit 30 provides information to the user operating the operation terminal 3, and accepts input by the user operating the operation terminal 3. The input/output unit 30 consists of a touch panel, for example. When the input/output unit 30 accepts the input by the user, the input/output unit 30 outputs a signal corresponding to the input to the processing unit 33.

The operator monitoring unit 31 is a unit that captures an image of the user operating the operation terminal 3. The operator monitoring unit 31 consists of a digital camera using a solid imaging element such as a CMOS, for example. The operator monitoring unit 31 is provided at a position to capture an image of a face including eyes of the user performing the input to the input/output unit 30.

The position detection unit 32 obtains positional information of the operation terminal 3. The position detection unit 32 may obtain the positional information of the operation terminal 3 by receiving a signal from a geodetic satellite (GPS satellite), for example. Alternatively, the position detection unit 32 may obtain information about a position of the operation terminal 3 relative to the vehicle V by communicating with the control device 15 via the communication device 9. The position detection unit 32 outputs the obtained positional information of the operation terminal 3 to the processing unit 33.

The processing unit 33 sends the control device 15 the signal from the input/output unit 30, the image of the user captured by the operator monitoring unit 31, and the positional information of the operation terminal 3 obtained by the position detection unit 32. Also, when the processing unit 33 receives a signal from the control device 15, the processing unit 33 processes the signal from the control device 15 and makes the input/output unit 30 provide information to the user operating the operation terminal 3. The input/output unit 30 may provide the information to the user by displaying the information thereon, for example.

The control device 15 can start the operation of the vehicle V (namely, the driving of the powertrain 4) based on a signal from the operation terminal 3. Also, the control device 15 can move the vehicle V to a prescribed position and park the vehicle V there based on a signal from the operation terminal 3. To control the vehicle V at this time, the control device 15 at least includes a starting unit 40, an external environment recognizing unit 41, a vehicle position identifying unit 42, an action plan unit 43, a traveling control unit 44, and a storage unit 45.

The starting unit 40 executes authentication of the smart key 14 based on a signal from the push start switch 11E included in the driving operation device 11. Also, the starting unit 40 determines whether the smart key 14 is located in the vehicle V. In a case where the authentication of the smart key 14 succeeds and the starting unit 40 determines that the smart key 14 is located inside the vehicle V, the starting unit 40 starts the driving of the powertrain 4 (namely, the starting unit 40 starts the operation of the vehicle V). Also, in a case where the control device 15 receives a signal that instructs a start of the operation of the vehicle V from the operation terminal 3, the starting unit 40 executes authentication of the operation terminal 3. In a case where the authentication of the operation terminal 3 succeeds, the starting unit 40 starts the driving of the powertrain 4 (namely, the starting unit 40 starts the operation of the vehicle V). In a case where the powertrain 4 includes an internal combustion engine, the starting unit 40 turns on an ignition device when the starting unit 40 starts the driving of the powertrain 4.

The external environment recognizing unit 41 recognizes an obstacle (for example, a parked vehicle or a wall) located around the vehicle V based on the detection result of the external environment sensor 7, and thereby obtains information about the obstacle. Further, the external environment recognizing unit 41 analyzes an image captured by the external cameras 18 based on a known image analysis method such as pattern matching, and thereby determines whether the obstacle is present and obtains the size of the obstacle in a case where the obstacle is present. Further, the external environment recognizing unit 41 may compute a distance to the obstacle based on signals from the sonars 17 to obtain the position of the obstacle.

The vehicle position identifying unit 42 identifies the position of the vehicle V based on a signal from the GPS receiving unit 20 of the navigation device 10. Further, the vehicle position identifying unit 42 may obtain the vehicle speed and yaw rate of the vehicle V from the vehicle sensor 8, in addition to the signal from the GPS receiving unit 20, to identify the position and posture of the vehicle V by so-called inertial navigation.

The external environment recognizing unit 41 analyzes the detection result of the external environment sensor 7 (more specifically, the images captured by the external cameras 18) based on a known image analysis method such as pattern matching, and thereby recognizes a position of a white line on a road surface of a parking area, for example.

The traveling control unit 44 controls the powertrain 4, the brake device 5, and the steering device 6 based on a traveling control instruction from the action plan unit 43 to make the vehicle V travel.

The storage unit 45 consists of a RAM and the like, and stores information necessary for executing processing of the action plan unit 43 and the traveling control unit 44.

When the HMI 13 or the operation terminal 3 accepts an input by the user, the action plan unit 43 computes a trajectory (traveling route) of the vehicle V and outputs the traveling control instruction to the traveling control unit 44, if necessary.

After the vehicle V has stopped, the action plan unit 43 executes parking assist processing, when the user performs an input corresponding to desire for parking assistance (remote parking assistance) by a remote operation. In the following, the parking assist processing will be described with reference to a sequence diagram of FIG. 3.

Figure 3:
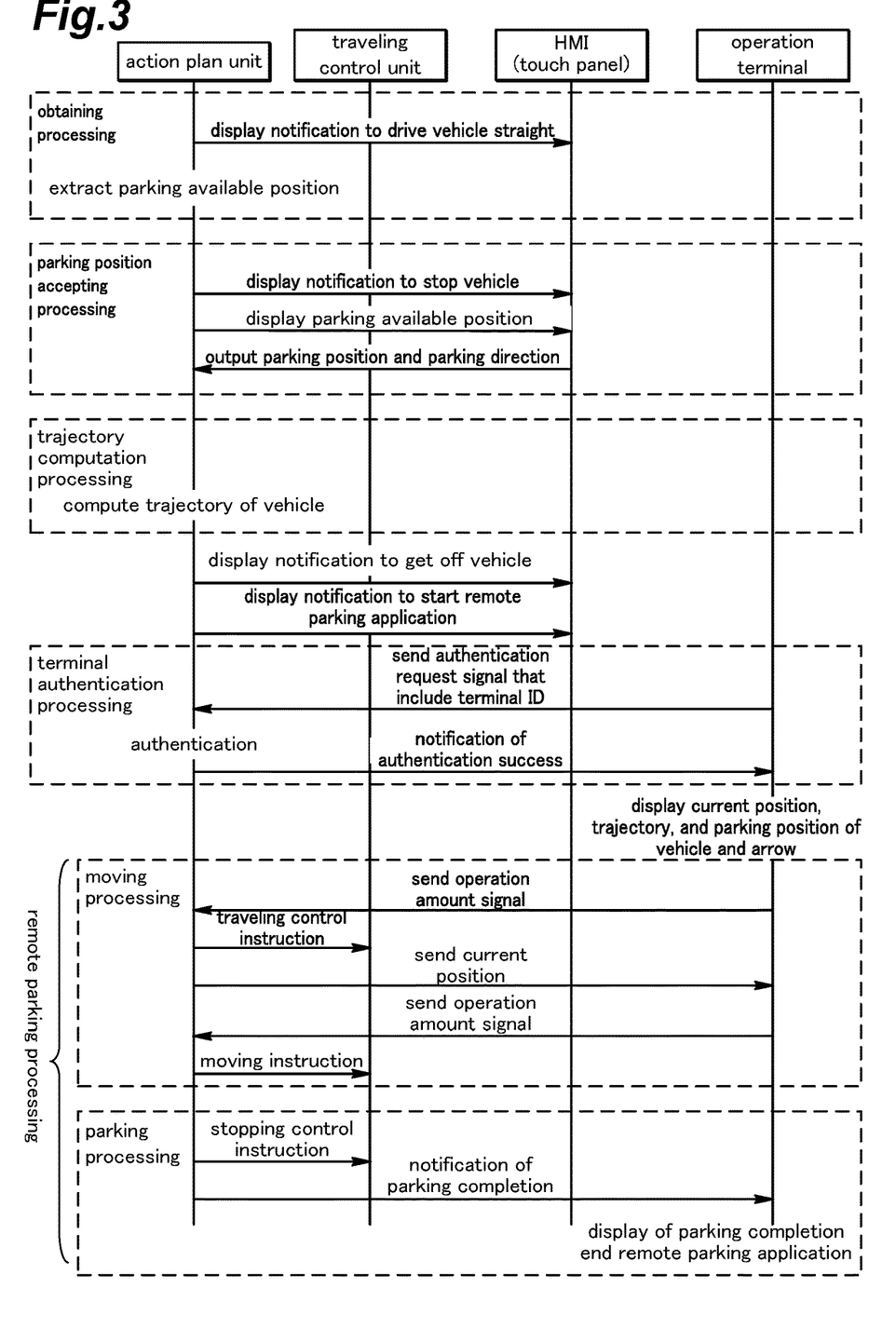
FIG. 3 is a sequence diagram of parking assist processing in the vehicle control system according to the embodiment of the present invention.

First, the action plan unit 43 executes obtaining processing to obtain at least one space to park the vehicle V (hereinafter referred to as "parking available position"). Specifically, the action plan unit 43 makes the touch panel 23 of the HMI 13 display a notification that instructs the driver to drive the vehicle V straight. While the driver is driving the vehicle V straight, the action plan unit 43 obtains the position and size of the obstacle and the position of the white line on the road surface based on the signal from the external environment sensor 7. The action plan unit 43 extracts the at least one parking available position based on the position and size of the obstacle and the position of the white line.

Next, the action plan unit 43 executes parking position accepting processing to accept a selection of a position to park the vehicle V (hereinafter referred to as "parking position") from the at least one parking available position. More specifically, the action plan unit 43 makes the touch panel 23 display a notification that instructs the user to stop the vehicle V, in a case where the action plan unit 43 extracts the at least one parking available position in the above obtaining processing. At this time, the action plan unit 43 may make the touch panel 23 also display a notification that instructs the user to change a position of the shift lever 11D to the parking position after the vehicle V has stopped.

Next, the action plan unit 43 makes the touch panel 23 display the current position of the vehicle V and the at least one parking available position. At this time, the action plan unit 43 may make the touch panel 23 display the current position of the vehicle V and the at least one parking available position on the image obtained by the external cameras 18. Thereafter, the action plan unit 43 makes the touch panel 23 display a notification that instructs the user to select the parking position from the at least one parking available position. When the user inputs a desired parking position to the touch panel 23, the touch panel 23 outputs a signal corresponding to the inputted parking position to the action plan unit 43. At this time, the action plan unit 43 may identify the desired parking position based on a position where the user touches the touch panel 23. At this time, the action plan unit 43 makes the touch panel 23 display a button for the user to select a parking direction (a forward parking direction or a backward parking direction). At this time, the action plan unit 43 may simply compute a pair of routes from the current position of the vehicle V to the parking position such that each route corresponds to the forward parking direction or the backward parking direction, and may make the touch panel 23 display the pair of routes. In such a case, the touch panel 23 may permit the user to select the parking direction by touching one of the pair of routes, and may output the selection result (namely, selected parking direction) to the action plan unit 43.

Next, when the action plan unit 43 receives the parking position inputted by the user from the touch panel 23, the action plan unit 43 executes trajectory computation processing to compute a trajectory of the vehicle V from the current position to the parking position. In a case where the user performs the input to select the parking direction, the action plan unit 43 may compute the trajectory of the vehicle V based on not only the current position and the parking position but also the parking direction selected by the user.

When the computation of the trajectory of the vehicle V is completed, the action plan unit 43 makes the touch panel 23 display a notification that urges the user to get off the vehicle V and a notification that instructs the user to start dedicated application software for the remote parking processing (hereinafter referred to as "remote parking application") in the operation terminal 3. According to these notifications, the user gets off the vehicle V, and then starts the remote parking application in the operation terminal 3.

Thereafter, the input/output unit 30 of the operation terminal 3 displays an input button to connect the operation terminal 3 to the vehicle V and to start the authentication of the operation terminal 3. When the user operates (for example, touches or pushes) the input button, the operation terminal 3 is connected to the vehicle V and the action plan unit 43 executes terminal authentication processing to execute the authentication of the operation terminal 3 connected to the vehicle V. In the terminal authentication processing, the operation terminal 3 sends the action plan unit 43 an authentication request signal that includes the terminal ID of the operation terminal 3, and the action plan unit 43 executes the authentication (determination) of the operation terminal 3 based on the terminal ID of the operation terminal 3. When the action plan unit 43 succeeds in the authentication of the operation terminal 3, the action plan unit 43 sends a signal to notify authentication success to the operation terminal 3, and then the input/output unit 30 of the operation terminal 3 displays the current position, trajectory, and parking position of the vehicle V and a vertical arrow. Thereby, the user can instruct the action plan unit 43 to execute the remote parking processing by performing the input to the input/output unit 30 of the operation terminal 3. The remote parking processing includes moving processing to move the vehicle V from the current position to the parking position and parking processing to park the vehicle V at the parking position.

When the user swipes (operates) the vertical arrow displayed on the input/output unit 30 of the operation terminal 3, the operation terminal 3 sends an operation amount signal corresponding to a swipe amount (operation amount) of the vertical arrow to the action plan unit 43. The action plan unit 43 converts the operation amount signal into a moving amount of the vehicle V and executes the moving processing to move the vehicle V along the trajectory by the computed moving amount until the vehicle V reaches the parking position. In the moving processing, the action plan unit 43 sends the traveling control instruction to the traveling control unit 44, and sends the current position of the vehicle V to the operation terminal 3.

During this moving processing, the action plan unit 43 determines whether the vehicle V has reached the parking position. When the action plan unit 43 determines that the vehicle V has reached the parking position, the action plan unit 43 executes the parking processing to park the vehicle V. In this parking process, the action plan unit 43 first sends a stopping control instruction to the traveling control unit 44 to activate the brake device 5. Thereafter, the action plan unit 43 activates the parking brake device 5A. When the parking processing is completed, the action plan unit 43 sends a notification of parking completion, which indicates that the parking processing has been completed, to the operation terminal 3.

When the operation terminal 3 receives the notification of parking completion, the input/output unit 30 of the operation terminal 3 displays a notification to indicate that the parking of the vehicle V has been completed, and the operation terminal 3 ends the remote parking application. Thereby, the parking assist processing is completed.

Figure 4A:
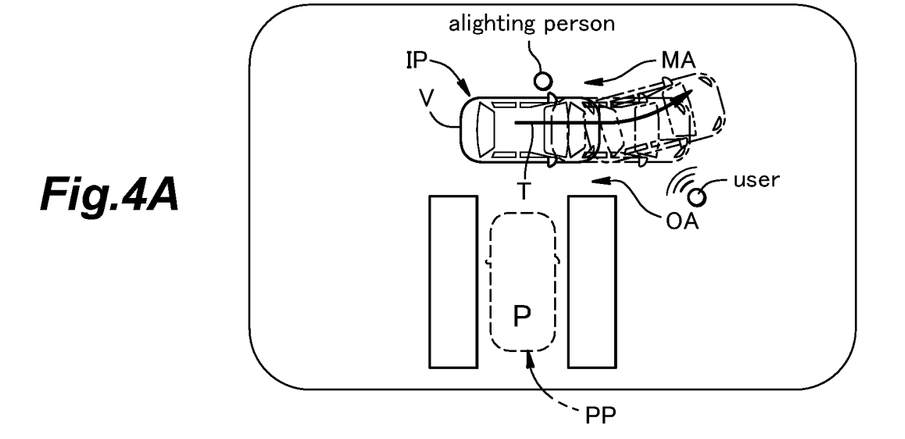
FIG. 4A is a schematic plan view showing a trajectory of the vehicle and a position of a user in a case where the user is present in an opposite side area with respect to the vehicle according to the embodiment of the present invention.
Figure 4B:
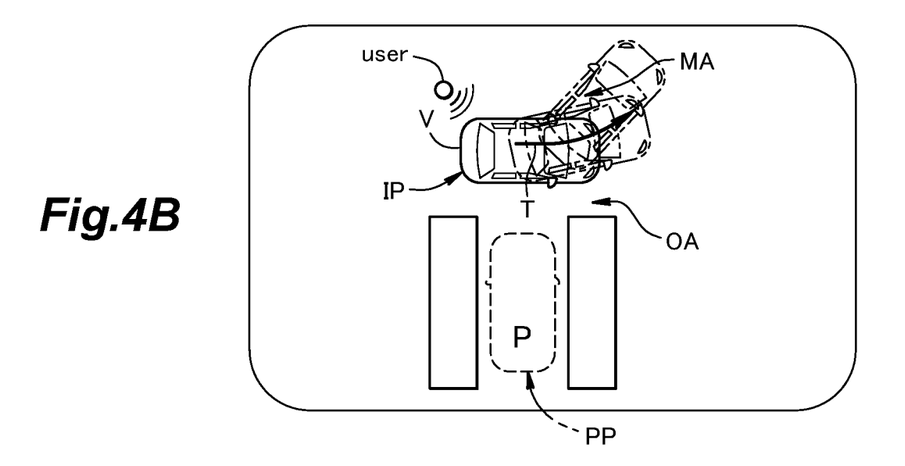
FIG. 4B is a schematic plan view showing the trajectory of the vehicle and the position of the user in a case where the user is present in a moving side area with respect to the vehicle according to the embodiment of the present invention.
Figure 4C:
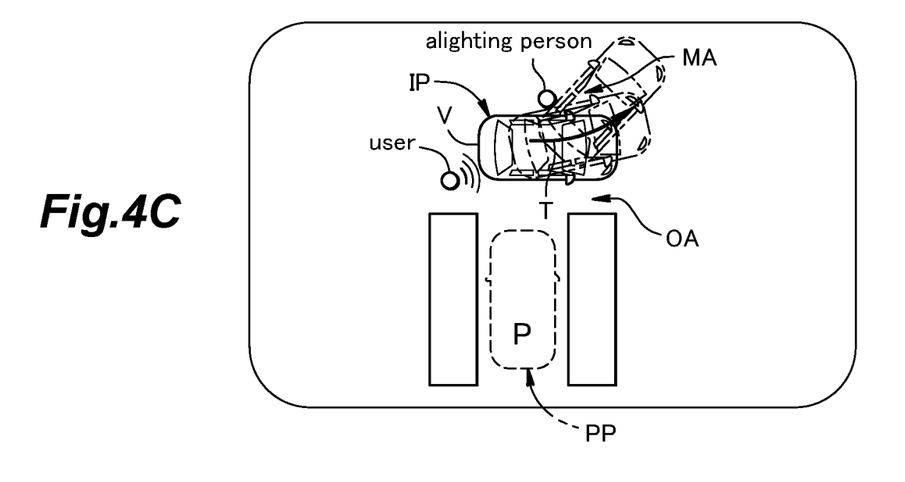
FIG. 4C is a schematic plan view showing the trajectory of the vehicle and the position of the user according to a comparative example.

Next, in the autonomous parking processing by the remote operation, a method for computing the trajectory T (traveling route) immediately after the remote operation is started is described in consideration of a person other than the user that can be the obstacle. FIGS. 4A to 4C show situations where the vehicle V is about to move forward and leftward so that the vehicle V is parked backward to the parking position PP present in the right of the vehicle V. In the following, an area located on one lateral side for which the vehicle V should be headed when the vehicle V travels from an initial position IP is referred to as "moving side area MA", and an area located on another lateral side (namely, an area opposite to the moving side area MA with respect to the vehicle V) is referred to as "opposite side area OA". For example, in FIGS. 4A to 4C, a left side of the vehicle V corresponds to the moving side area MA, and a right side of the vehicle V corresponds to the opposite side area OA. Also, among the occupants who alighted from the vehicle V, a person other than the user is referred to as "alighting person".

FIG. 4C shows a comparative example. As shown in FIG. 2, at either lateral side of the vehicle V, there is a blind spot of the external environment sensor 7 such as the sonars 17 and the external cameras 18. Therefore, the external environment recognizing unit 41 (see FIG. 1) may not be able to recognize the person such as the alighting person present in either lateral side of the vehicle V. When the user is present in the opposite side area OA, the moving side area MA is in the blind spot of the user, because the user's sightline is blocked by the vehicle V. When the moving side area MA is in the blind spots of the user and the external environment sensor 7, it is not preferable to move the vehicle V to the moving side area MA immediately from the initial position IP.

FIG. 4A shows a case where the user is present in the opposite side area OA with respect to the vehicle V according to the present embodiment. As shown in FIGS. 1, 2, and 4A, when the user is present in the opposite side area OA, the action plan unit 43 does not compute the trajectory T to move the vehicle V to the moving side area MA immediately from the initial position IP, but computes the trajectory T such that the vehicle V moves straight for a prescribed distance or more from the initial position IP to detect presence/absence of the obstacle such as the alighting person by the sonars 17. The prescribed distance is set to a distance in the fore-and-aft direction between the pair of sonars 17 (hereinafter referred to as "front sonars 17") provided at the front ends of the left and right faces of the vehicle V and the pair of sonars 17 (hereinafter referred to as "rear sonars 17") provided at the rear ends of the left and right faces of the vehicle V. The action plan unit 43 computes the remaining trajectory T based on the detection results of the sonars 17.

FIG. 4B shows a case where the user is present in the moving side area MA with respect to the vehicle V according to the present embodiment. As shown in FIGS. 1, 2, and 4B, when the user is present in the moving side area MA, the user is expected to escape from the vicinity of the vehicle V by himself/herself and to make the person such as the alighting person present in the moving side area MA escape from the vicinity of the vehicle V by some means (for example, by speaking to the person). Further, the user can stop the vehicle V if necessary. Therefore, the safety of the person in the moving side area MA can be ensured. Also, the vehicle V that has started moving from the initial position IP does not move to the opposite side area OA in the early stage of its movement. Further, even if the person is present in the opposite side area OA that is in the blind spots of the user and the external environment sensor 7 when the vehicle V is in the initial position IP, the person can be detected by the external environment sensor 7 such as the sonars 17 and the external cameras 18 as the vehicle V moves. Therefore, the safety of the person present in the opposite side area OA can be ensured. Accordingly, the action plan unit 43 computes the trajectory T so as to move the vehicle V to the moving side area MA immediately from the initial position IP.

Figure 5:
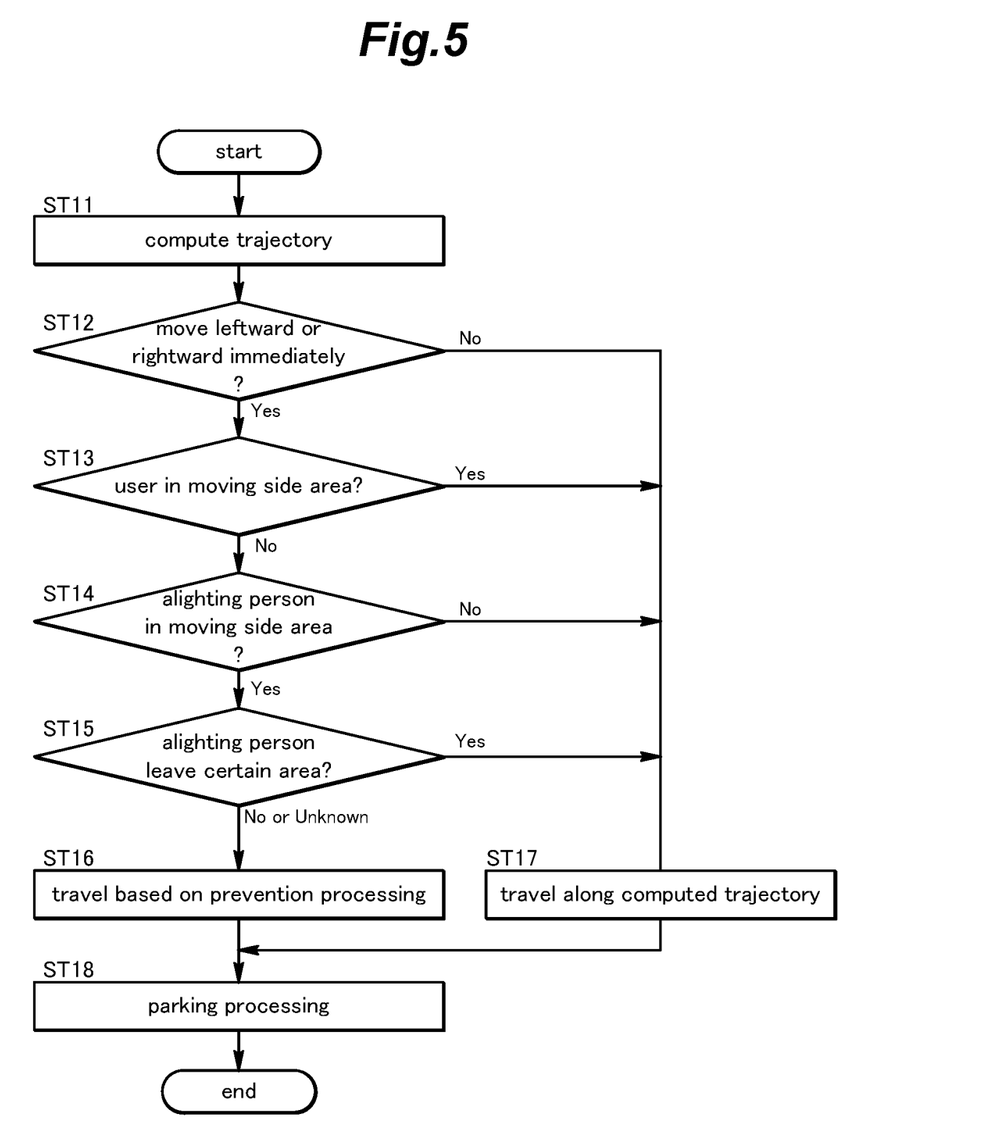
FIG. 5 is a flow chart showing parking processing of the vehicle control system according to the embodiment of the present invention.

In the following, with reference to FIGS. 1, 4, and 5, the procedure for controlling the vehicle V will be described on the assumption that the person is the alighting person.

After the action plan unit 43 computes the trajectory T (step ST11, the trajectory computation processing in FIG. 3), the occupant alights from the vehicle V. The position of the vehicle V at a time when the occupant alights from the vehicle V is set to the initial position IP.

Next, the action plan unit 43 determines whether the trajectory T is computed such that the vehicle V moves leftward or rightward immediately from the initial position IP, which is a starting point of the trajectory T (step ST12). For example, as shown in FIGS. 4B and 4C, the trajectory T may be computed such that the vehicle V moves leftward or rightward immediately from the initial position IP in a case where the fore-and-aft direction of the vehicle V in the initial position IP is approximately orthogonal to the fore-and-aft direction of the vehicle V in the parking position PP and the initial position IP is located at a front of the parking position PP. Incidentally, in other embodiments, an angle between the fore-and-aft direction of the vehicle V in the initial position IP and the fore-and-aft direction of the vehicle V in the parking position PP may be acute. By locating the initial position IP and the parking position PP as described above, the traveling route for moving the vehicle V backward to the parking position PP can be shortened. Therefore, the user can alight from the vehicle V near the position where the user can easily monitor the vehicle V during the remote operation thereof.

In a case where the parking position PP is remote from the initial position IP and the trajectory T is computed such that the vehicle V moves straight forward or backward immediately from the initial position IP (No in step ST12), the alighting person to be present on a lateral side of the vehicle V may not be caught by the vehicle V while the vehicle V is moving straight. Also, even if there are the blind spots of the front and rear sonars 17 when the vehicle V is in the initial position IP, the front and rear sonars 17 can detect the blind spots while the vehicle V is moving straight. The action plan unit 43 can compute the trajectory T again, if necessary, at a timing when the person including the alighting person is newly found. As such, at least until the person as a new obstacle is found, the action plan unit 43 maintains the computed trajectory T and the traveling control unit 44 makes the vehicle V travel along the computed trajectory T at a first speed (step ST17).

In a case where the trajectory T is computed such that the vehicle V moves leftward or rightward immediately from the initial position IP (Yes in step ST12), the alighting person on the lateral side of the vehicle V, if any, may be caught by the vehicle V. In such a case, the action plan unit 43 determines whether the user is present in the moving side area MA (i.e. whether the operation terminal 3 held by the user is present in the moving side area MA) to check whether the user can monitor the moving side area MA (step ST13). The terminal position, which indicates the position of the operation terminal 3 in a coordinate, is detected by the position detection unit 32 of the operation terminal 3 and sent from the operation terminal 3 to the control device 15. The action plan unit 43 determines whether the user holding the operation terminal 3 is present in the moving side area MA based on the terminal position received from the operation terminal 3 and information provided from the navigation device 10. In a case where the user is present in the moving side area MA (Yes in step ST13, FIG. 4B), the user can escape from the vicinity of the vehicle V so that the user is not caught by the vehicle V. Also, the user can make the alighting person escape from the vicinity of the vehicle V so that the alighting person is not caught by the vehicle V. Further, the user can operate the operation terminal 3 to stop the vehicle V, if necessary. As such, the traveling control unit 44 makes the vehicle V travel along the computed trajectory T (step ST17). Incidentally, in a case where the user is present in the front or rear of the vehicle V, the blind spot of the user in the moving side area MA is relatively small. Therefore, the traveling control unit 44 may make the vehicle V travel along the computed trajectory T as in the case where the user is in the moving side area MA.

In a case where the user is not present in the moving side area MA (No in step ST13), specifically in a case where the user is present in the opposite side area OA (FIG. 4A), the user may not be able to lead the alighting person present in the moving side area MA to escape from the vicinity of the vehicle V, since the moving side area MA may be in the blind spot of the user. In such a case, the external environment recognizing unit 41 determines whether the alighting person was present in the moving side area MA (step ST14). In a case where the door of the vehicle V facing the moving side area MA was not opened and closed, the external environment recognizing unit 41 determines that the alighting person was not present in the moving side area MA. On the other hand, in a case where the door of the vehicle V facing the moving side area MA was opened and closed, the external environment recognizing unit 41 determines whether the alighting person was present by comparing images captured by the external cameras 18 immediately before and immediately after the door is opened and closed. For example, the external environment recognizing unit 41 compares the images captured immediately before and immediately after the door is opened and closed, and determines that the alighting person was present in a case where the object in the images is changed by a prescribed number of pixels or more. Thereby, it is possible to determine whether the alighting person was present by comparing images captured with a short time difference while the vehicle V is stopped. Therefore, it is possible to determine whether the alighting person was present by using relatively simple logic.

In a case where the alighting person was not present in the moving side area MA (No in step ST14), it is estimated that the alighting person who may be caught by the vehicle V is not present. Therefore, the traveling control unit 44 makes the vehicle V travel along a computed trajectory T that moves the vehicle V to the moving side area MA immediately from the vicinity of the initial position IP (step ST17).

In a case where the alighting person was present in the moving side area MA (Yes in step ST14), the action plan unit 43 determines, based on the images captured by the external cameras 18 before the user performs an input operation for starting the moving processing to the operation terminal 3, whether the alighting person has left a certain area where the alighting person can be caught by the vehicle V (step ST15). For example, the action plan unit 43 determines that the alighting person has not left the certain area in a case where the alighting person is present in the images of the certain area captured by the external cameras 18 when the user starts the remote operation of the vehicle V. The action plan unit 43 determines that the alighting person has left the certain area in a case where the alighting person has left the certain area before entering the blind spots of the external cameras 18. The action plan unit 43 determines that whether the alighting person has left the certain area is unknown in a case where the alighting person enters the blind spots of the external cameras 18 before leaving the certain area. The above "certain area where the alighting person can be caught by the vehicle V" is, for example, an area within a prescribed distance from the lateral face of the vehicle V traveling along a curved trajectory T. As described above, the person is limited to the alighting person, and the external cameras 18 recognize the position of the alighting person or recognize that the position of the alighting person is unknown. Therefore, the monitoring target can be simplified, and the logic for recognizing the monitoring target can be simplified.

In a case where the action plan unit 43 determines that the alighting person has left the certain area (Yes in step ST15), the traveling control unit 44 makes the vehicle V travel along the computed trajectory T (step ST17). In a case where the action plan unit 43 determines that the alighting person has not left the certain area or that whether the alighting person has left the certain area is unknown (No or Unknown in step ST15), the traveling control unit 44 makes the vehicle V travel based on prevention processing (step ST16).

In the prevention processing, for example, the action plan unit 43 may compute the trajectory T again such that the vehicle V reaches the parking position PP after moving straight for the prescribed distance or more (FIG. 4A). Preferably, the prescribed distance is set to the distance in the fore-and-aft direction between the front and rear sonars 17 so that these sonars 17 can reliably detect the alighting person who was present in the blind spots of the sonars 17 when the vehicle V was at the initial position IP. According to this processing, while the vehicle V is moving straight, safety of the front and rear parts of the vehicle V can be ensured by the front and rear sonars 17. Further, by moving the vehicle V straight, the alighting person, who was present in the blind spots of the sonars 17 when the vehicle V was at the initial position IP, can be detected by the sonars 17. The action plan unit 43 may compute the remaining trajectory T based on the detection results of the sonars 17. In addition, when the alighting person is detected, the action plan unit 43 may make the traveling control unit 44 stop or decelerate the vehicle V. By executing this processing, it is possible to prevent the alighting person from being caught by the vehicle V. Preferably, this processing may be executed in a case where whether the alighting person has left the certain area is unknown. For example, the action plan unit 43 may execute this processing in a case where whether the alighting person has left the certain area is unknown, and may compute the trajectory T again such that the alighting person is not caught by the vehicle V in a case where the alighting person has not left the certain area.

Alternatively, in the prevention processing, the traveling control unit 44 may make the vehicle V travel along the trajectory T (traveling route) at a second speed lower than the first speed (see step ST17) at least in a prescribed section from the initial position IP. For example, the prescribed section may be set to a section from the initial position IP to a position where the moving direction of the vehicle V is changed between the forward and backward directions, or set to a section corresponding to the distance in the fore-and-aft direction between the front and rear sonars 17. Since the vehicle V is moving slowly, the alighting person in the moving side area MA may have enough time to recognize that he or she may be caught by the vehicle V and to escape from the vicinity of the vehicle V.

In a case where the alighting person is newly found at a position to be the obstacle for the vehicle V moving along the trajectory T during step ST16 or step ST17, the traveling control unit 44 stops the vehicle V. When the newly found alighting person leaves the trajectory T of the vehicle V, the traveling control unit 44 resumes traveling of the vehicle V. Incidentally, the action plan unit 43 may compute the trajectory T again such that the vehicle V avoids the alighting person in a case where the alighting person does not move from the position to be the obstacle for the vehicle V within a prescribed period. When the vehicle V reaches the parking position PP by executing step ST16 or step ST17, the parking processing is executed (step ST18).

In the above descriptions, the alighting person is set to the obstacle. In other embodiments, not only the alighting person but also the person other than the alighting person may be set to the obstacle. Such a setting of the obstacle is suitable for a case where the person other than the alighting person can be recognized by using the information obtained by the external environment sensor 7 before the vehicle V reaches the initial position IP, the period from a timing when the vehicle V stops at the initial position IP to a timing when the vehicle V starts moving by a remote operation is relatively short, and the recognized person does not move significantly. In a case where the period from the timing when the vehicle V stops at the initial position IP to the timing when the vehicle V starts moving is relatively long, there is a high possibility that the position of the person has changed from the position identified based on the information obtained by the external environment sensor 7 until the vehicle V reaches the initial position IP. In such a case, steps ST14 and ST15 may be omitted and the vehicle V may travel based on the prevention processing (step ST16) in a case where the user is not present in the moving side area MA.

As described above, when the person such as the alighting person is present in the area that can be monitored by the user, the user is expected to take necessary steps such as guiding the alighting person. In light of this expectation, the control device 15 makes the vehicle V travel along a trajectory T (traveling route) that is not restricted by the person, so that the trajectory T can be shortened. On the other hand, in a case where a part of the moving side area MA cannot be monitored by the user and the person such as the alighting person may be present in the part of the moving side area MA, the control device 15 makes the vehicle V move straight for the prescribed distance or more so that the sonars 17 can detect the person, or makes the vehicle V move slowly so that the person can easily escape. Therefore, safety can be ensured, and the trajectory T can be prevented from being lengthened.

Concrete embodiments of the present invention have been described in the foregoing, but the present invention should not be limited by the foregoing embodiments and various modifications and alterations are possible within the scope of the present invention. The user holding the operation terminal 3 and performing the remote operation of the vehicle V may be a driver, an occupant other than the driver, or a person other than the occupant. The control device 15 may compute the trajectory T of the vehicle V (see step ST11) after determining whether the user is present in the moving side area MA (see step ST13).

The invention claimed is:

1. A vehicle control system, comprising:
a terminal configured to be carried by a user;
a control device configured to execute remote autonomous parking processing to move a vehicle from an initial position to a parking position and to stop the vehicle at the parking position in response to an instruction from the terminal; and
an external environment sensor configured to detect an obstacle around the vehicle and to send a detection result to the control device,
wherein the control device includes an action plan unit configured to compute a traveling route of the vehicle from the initial position to the parking position, an external environment recognizing unit configured to recognize presence/absence of the obstacle around the vehicle based on the detection result sent from the external environment sensor, and a traveling control unit configured to make the vehicle travel along the traveling route,
the terminal includes an input unit configured to accept an instruction to move the vehicle and an instruction to stop the vehicle, the terminal configured to obtain a terminal position that indicates a position of the terminal,
in a case where a prescribed condition is satisfied, the action plan unit computes or maintains the traveling route that is not restricted by a person, different from the user, to be present in a moving side area located on a lateral side of the vehicle toward which the vehicle is turning when the vehicle departs from the initial position, the moving side area including at least one blind spot in which the person present in the moving side area cannot be detected by the external environment sensor,
in a case where the prescribed condition is not satisfied, the action plan unit computes the traveling route such that the vehicle reaches the parking position after moving straight for a prescribed distance or more, and
the prescribed condition is satisfied in a case where the terminal position is present in the moving side area.

2. The vehicle control system according to claim 1, wherein the external environment sensor includes a pair of front sensors provided at front ends of lateral faces of the vehicle to detect the obstacle on either lateral side of the vehicle and a pair of rear sensors provided at rear ends of the lateral faces of the vehicle to detect the obstacle on either lateral side of the vehicle, and
the prescribed distance is a distance in a fore-and-aft direction between the pair of front sensors and the pair of rear sensors.

3. The vehicle control system according to claim 1, wherein, in a case where the external environment recognizing unit recognizes the person present in the moving side area based on the detection result sent from the external environment sensor while the vehicle is moving straight along the traveling route computed such that the vehicle reaches the parking position after moving straight for the prescribed distance or more, the action plan unit computes the traveling route again such that the vehicle avoids the person or makes the traveling control unit stop or decelerate the vehicle.

4. The vehicle control system according to claim 1, wherein the prescribed condition is satisfied in a case where the terminal position is present in a front or rear of the vehicle.

5. The vehicle control system according to claim 1, wherein the external environment sensor includes at least one external camera provided in a door mirror and/or a center pillar of the vehicle and is configured to capture an image of a rear of either a lateral part of the vehicle and/or an image of either lateral side of the vehicle, the external environment recognizing unit is configured to determine whether an alighting person who alighted from the vehicle was present by comparing images captured by the at least one external camera immediately before and immediately after a door of the vehicle is opened and closed, and the prescribed condition is satisfied in a case where the external environment recognizing unit determines that the alighting person was not present in the moving side area.

6. The vehicle control system according to claim 5, wherein the prescribed condition is satisfied in a case where the external environment recognizing unit determines that the alighting person was present in the moving side area and determines, based on the image captured by the at least one external camera after the door is opened and closed and before the vehicle starts to travel, that the alighting person has left a certain area where the alighting person can be caught by the vehicle before entering a blind spot of the at least one external camera, and the prescribed condition is not satisfied in a case where the terminal position is present in an opposite side area located on another lateral side and the external environment recognizing unit determines that the alighting person was present in the moving side area and determines, based on the image captured by the at least one external camera, that the alighting person stays within the certain area at a timing when a remote operation of the vehicle is started or that the alighting person enters the blind spot of the at least one external camera before leaving the certain area.

7. The vehicle control system according to claim 1, wherein the initial position is located at a front of the parking position, and a fore-and-aft direction of the vehicle in the initial position is approximately orthogonal to a fore-and-aft direction of the vehicle in the parking position or an angle between the fore-and-aft direction of the vehicle in the initial position and the fore-and-aft direction of the vehicle in the parking position is acute.

8. A vehicle control system, comprising:

a terminal configured to be carried by a user;

a control device configured to execute remote autonomous parking processing to move a vehicle from an initial position to a parking position and to stop the vehicle at the parking position in response to an instruction from the terminal; and an external environment sensor configured to detect an obstacle around the vehicle and to send a detection result to the control device, wherein the control device includes an action plan unit configured to compute a traveling route of the vehicle from the initial position to the parking position, an external environment recognizing unit configured to recognize presence/absence of the obstacle around the vehicle based on the detection result sent from the external environment sensor, and a traveling control unit configured to make the vehicle travel along the traveling route, the terminal includes an input unit configured to accept an instruction to move the vehicle and an instruction to stop the vehicle, the terminal configured to obtain a terminal position that indicates a position of the terminal, in a case where a prescribed condition is satisfied, the traveling control unit makes the vehicle travel at a first speed along the traveling route computed such that the traveling route is not restricted by a person, different from the user, to be present in a moving side area located on a lateral side of the vehicle toward which the vehicle is turning when the vehicle departs from the initial position, the moving side area including at least one blind spot in which the person present in the moving side area cannot be detected by the external environment sensor, in a case where the prescribed condition is not satisfied, the traveling control unit makes the vehicle travel at a second speed lower than the first speed along the traveling route at least in a prescribed section from the initial position, and the prescribed condition is satisfied in a case where the terminal position is present in the moving side area.

* * * * *